(12) United States Patent
Noda et al.

(10) Patent No.: US 6,270,148 B1
(45) Date of Patent: Aug. 7, 2001

(54) SLIDE DOOR APPARATUS FOR VEHICLES

(75) Inventors: Kohei Noda, Toyota; Tomoaki Imaizumi, Okazaki; Eiji Itami, Toyota; Ryoichi Fukumoto, Nagoya; Katsuhisa Yamada, Toyota; Masao Ohhashi, Kariya; Shintaro Suzuki, Kasugai, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/449,669

(22) Filed: Nov. 30, 1999

(30) Foreign Application Priority Data

Nov. 30, 1998 (JP) .................................................. 10-340532

(51) Int. Cl.$^7$ ........................................................ B60J 5/06
(52) U.S. Cl. .............................. 296/155; 49/360; 303/6.1
(58) Field of Search ............................... 296/155; 49/360, 49/138; 303/6.1

(56) References Cited

U.S. PATENT DOCUMENTS

| | | | |
|---|---|---|---|
| 4,984,385 | * | 1/1991 | De Land ............................ 49/360 X |
| 5,140,316 | * | 8/1992 | De Land et al. .................. 296/155 X |
| 5,913,563 | * | 6/1999 | Wantanabe et al. ................... 296/155 |
| 6,009,671 | * | 1/2000 | Sasaki et al. ............................ 49/352 |
| 6,087,794 | * | 7/2000 | Kawanobe ............................. 318/446 |
| 6,119,825 | * | 9/2000 | Nisley ................................... 188/171 |
| 6,125,583 | * | 10/2000 | Murray et al. .......................... 49/291 |

FOREIGN PATENT DOCUMENTS

| | | | |
|---|---|---|---|
| 0199722 | * | 10/1985 | (JP) ..................................... 296/155 |
| 9-4323 | | 1/1997 | (JP) . |
| 10-18708 | | 1/1998 | (JP) . |
| 10-8828 | | 1/1998 | (JP) . |

* cited by examiner

Primary Examiner—D. Glenn Dayoan
Assistant Examiner—Patricia Engle
(74) Attorney, Agent, or Firm—Burns, Doane, Swecker & Mathis, LLP

(57) ABSTRACT

A vehicular slide door apparatus includes a slide door which opens and closes an opening formed in the lateral side of the vehicle body 2. A brake device is provided at the lateral side of the vehicle body to apply a braking force to the slide door. The brake device is under the control of an electronic control device.

12 Claims, 15 Drawing Sheets

SLIDE DOOR APPARATUS FOR VEHICLES

This application is based on and claims priority under 35 U.S.C. §119 with respect to Japanese Application No. 10(1998)-340532 filed on Nov. 30, 1998, the entire content of which is incorporated herein by reference.

FIELD OF THE INVENTION

The present invention generally relates to a vehicle door. More particularly, the present invention pertains to a slide door apparatus for vehicles.

BACKGROUND OF THE INVENTION

Known types of slide door apparatus are disclosed in Japanese Patent Laid-Open Publication Nos. Hei.9-4323, Hei.10-8828, and Hei.10-18708.

In each of these apparatus, when an electrically operated driving mechanism is turned on, the resultant rotation in one direction moves the slide door in its opening direction, thereby opening the opening area formed in the side of the vehicle body. The resulting rotation in the other direction moves the slide door in its closing direction, thereby closing the opening area formed in the side of the vehicle body.

A clutch mechanism is interposed between the driving mechanism and the slide door. If the clutch mechanism is in its disengaged condition, the slide door is isolated from the driving mechanism, thereby allowing the slide door to be moved manually. However, when the vehicle is parked on a sloping road, the gravity applied to the inclined slide door causes the door to be opened unexpectedly and excessively fast.

Accordingly, a need exists for a slide door apparatus for vehicles in which the sliding speed of the slide door is controllable or adjustable.

SUMMARY OF THE INVENTION

In light of the foregoing, one aspect of the present invention relates to a vehicular slide door apparatus that includes a slide door movable in the lengthwise direction of the vehicle for opening and closing an opening area formed in a lateral side of the vehicle body, a brake device provided at the lateral side of the vehicle body for applying a brake force to the slide door, and an electronic control device operatively associated with the brake device to restrict movement of the slide door from an opened position to a closed position.

According to another aspect of the invention, a vehicular slide door apparatus includes a slide door mounted on the lateral side of a vehicle body for movement in a lengthwise direction of the vehicle body between a fully open position and a fully closed position, and a brake device operatively associated with the slide door for applying a brake force to the slide door as the slide door moves from the fully open position towards the fully closed position to restrict movement of the slide door during movement from the fully open position towards the fully closed position.

Another aspect of the present invention involves a vehicular slide door apparatus that includes a slide door mounted on a lateral side of a vehicle body for movement in a lengthwise direction of the vehicle body between a fully open position and a fully closed position, a brake device operatively associated with the slide door for applying a brake force to the slide door as the slide door moves from the fully open position towards the fully closed position to restrict movement of the slide door during movement from the fully open position towards the fully closed position, and a control device connected to the brake device to control operation of the brake device and cause the brake device to apply the braking force to the slide door for a predetermined time period and to release the braking force upon elapse of the predetermined time period.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE PRESENT INVENTION

Figure 1:
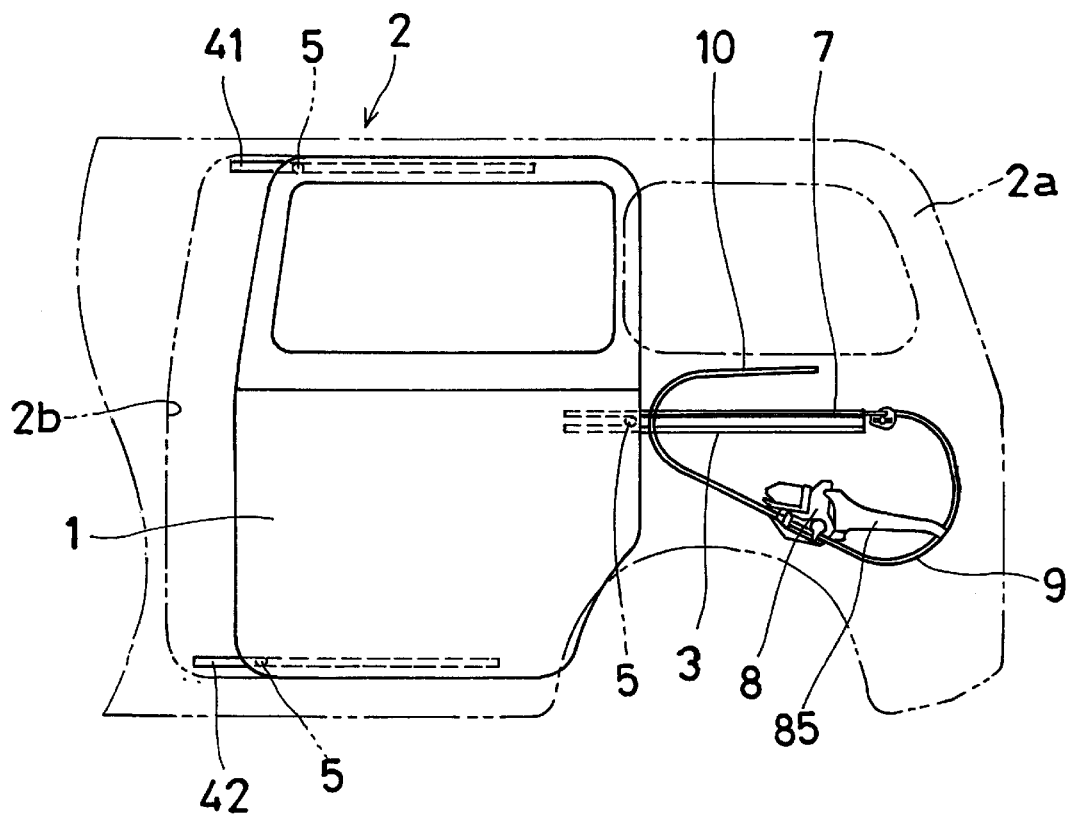
FIG. 1 is a side view of a vehicle body at which is located a slide door apparatus according to the present invention.
Figure 2:
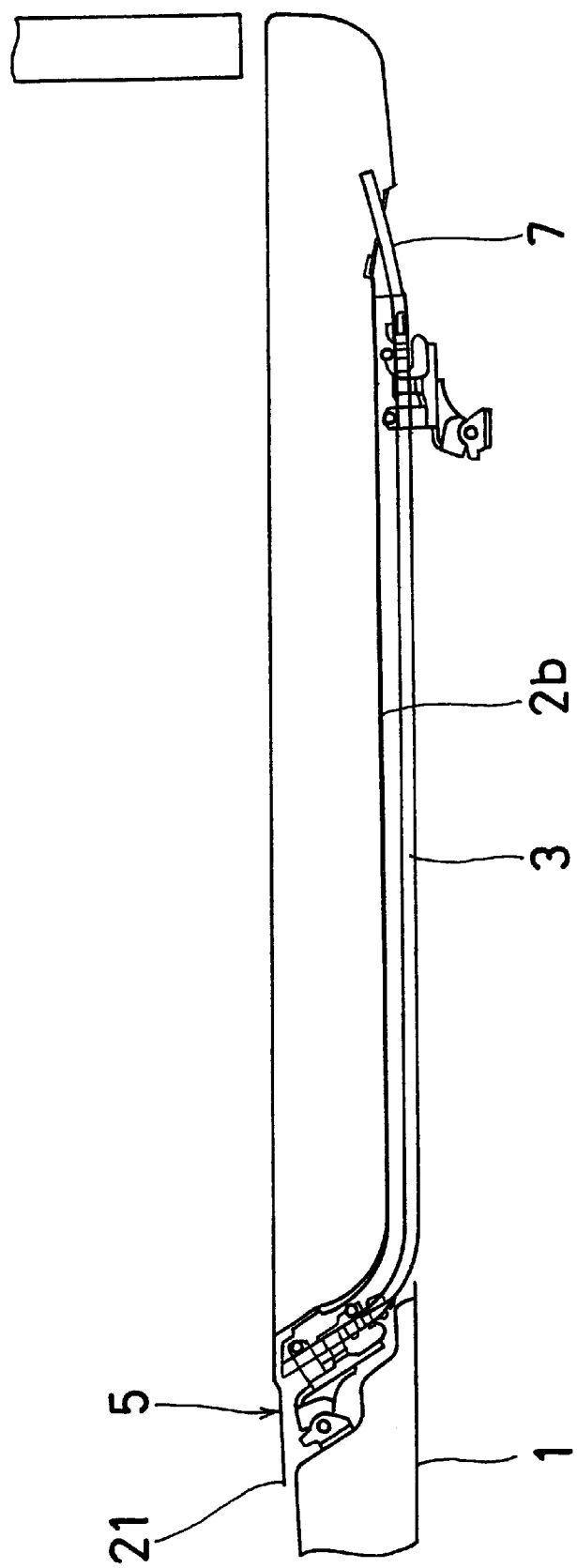
FIG. 2 is a horizontal cross-sectional view of the slide door apparatus shown in FIG. 1.

FIGS. 1 and 2 illustrate the rear portion of the vehicle body 2 of a van type vehicle. The lateral side 2a of the vehicle body 2 is provided with an opening area 2b possessing a substantially rectangular shape. The opening area 2b is adapted to be closed and opened by a slide door 1. The slide door 1 is supported by an upper guide rail 41, a lower guide rail 42 and a center guide rail 3 so as to be movable in the vehicle lengthwise direction corresponding to the right-and-left direction in FIG. 1.

The upper guide rail 41 is arranged along the upper periphery of the opening area 2b at a position closely adjacent the opening area 2b is secured to the lateral side 2a of the vehicle body 2 by way of suitable connecting devices such as screws. The lower guide rail 42 is arranged along the lower periphery of the opening area 2b at a position closely adjacent the opening area 2b is secured to the lateral side 2a of the vehicle body 2 by way of suitable connecting devices such as screws. The center guide rail 3 is positioned at the rear side of the opening area 2b and is secured to the lateral side 2a of the vehicle body 2 by way of suitable connecting devices such as screws.

The slide door 1 is provided with three guide roller units 5 which slidably engage the respective guide rails 3, 41, 42, thereby allowing the slide door 1 to slide along the guide rails 3, 41, 42. The guide rails 3, 41, 42 are arranged parallel to each other and extend in the vehicle lengthwise direction. For establishing a coplanar relationship between the outer surface of the slide door and the outer surface of the lateral side 2a of the vehicle body 2 when the opening area 2b is fully closed by the slide door 1, the front end of each of the guide rails 3, 41, 42 is bent toward the interior or inner space of the vehicle body 2. When the opening area 2b is fully opened, the slide door 1 is positioned at the rear side of the opening area 2b and is positioned in an overlapping or layered condition relative to the lateral side 2a of the vehicle body 2.

Figure 3:
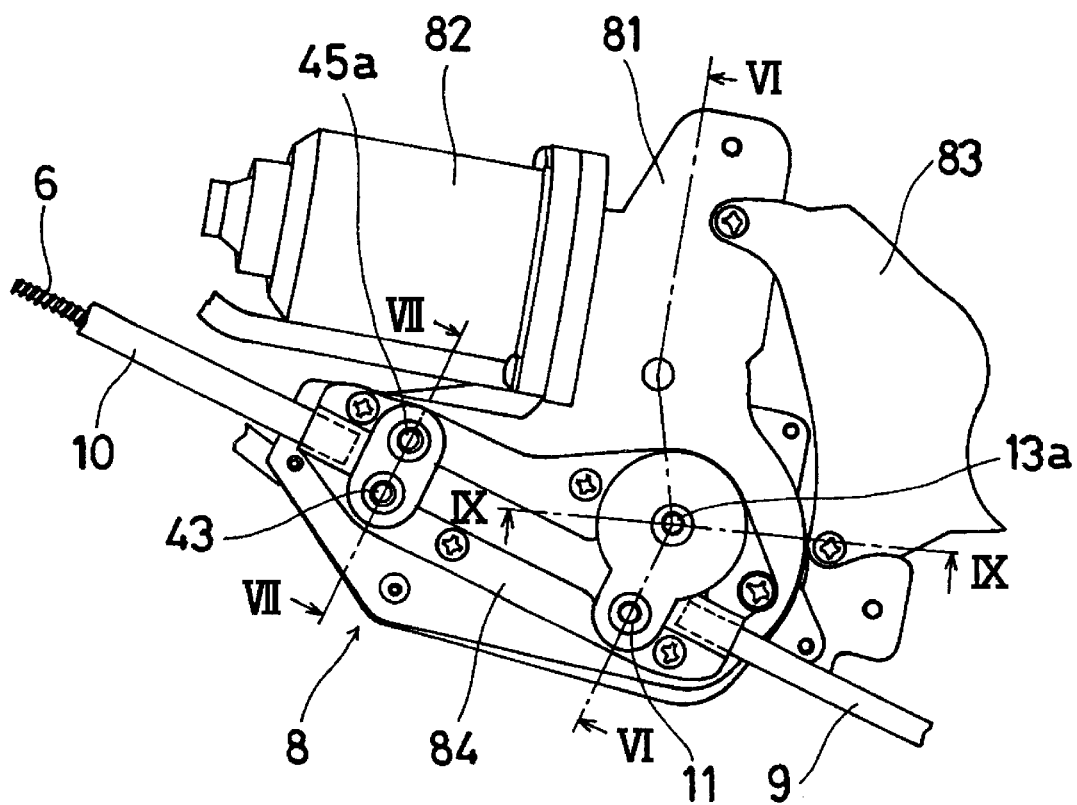
FIG. 3 is a front view of the driving device associated with the slide door apparatus shown in FIG. 1.

The roller unit 5 which slides along the center guide rail 3 is connected to one end of a geared cable 6, seen in FIG. 3, which passes through several guide pipes 7, 9, 10. The other end of the geared cable 6 forms a free end of the cable. The geared cable 6 is connected to a drive device 8, the details of which will be described below, at a position between the guide pipes 7, 9. The guide pipe 7 extends along the center guide rail 3 and is secured to the center guide rail 3. The guide pipe 9 is fixed to the inside of the vehicle body 2, with one end of the guide pipe 9 passing therethrough for being connected to the guide pipe 7 at the rear portion of the guide rail 3. The other end of the guide pipe 9 is connected to the drive device 8. The guide pipe 10 is fixed inside the vehicle body 2 and is connected to the drive device 8.

When the drive device 8 is turned on, the geared cable 6 is moved in one direction, which causes movement of the center positioned roller unit 5 along the center guide rail 3. As a result, the slide door 1 moves along the guide rails 3, 41, 42 , thereby opening the opening area 2b in the lateral side 2a of the vehicle body. When the drive device 8 is operated in the opposite direction, the geared cable 6 is moved in the opposite direction, and this causes movement of the center positioned roller unit 5 along the center guide rail 3 in the opposite direction. The slide door 1 is thus moved along the guide rails 3, 41, 42, thereby closing the opening area 2b in the lateral side 2a of the vehicle body.

Referring to FIGS. 3–7, the drive device 8 includes a casing 81 and an electric motor 82 functioning as an electrical driving source. The casing 81 is fixedly mounted on a bracket 83 which is secured to the lateral side 2a of the vehicle body 2. The motor 82 is fastened to the casing 81. The casing 81 includes a first housing part 81a and a second housing part 81b which are coupled or connected with each other by way of bolts 81c. An inner space D is defined within the housing that results from connection of the two housing parts 81a, 81b. The housing part 81a of the casing 81 is connected with a cover 84 by a bolt 84a, thereby defining an accommodating space E between the housing part 81a and the cover 84.

A shaft 11 is journalled in the casing 81. The shaft 11 passes through the housing part 81a, the inner space D, and the accommodating space E. One end portion 11a of the shaft 11 is journalled in the cover 84 via a bush 84b, while the other end portion 11b of the shaft 11 is journalled in the housing part 81b via a bush 81d. A portion 11c of the shaft 11 is also journalled in the housing part 81a via a bush 81e. Between the end portions 11a, 11c, the shaft 11 is provided with a portion 11e in the form of a serration which is positioned in the accommodating space E. Between the portions 11a, 11b, the shaft 11 is provided with a supporting portion 11f and a serrated portion 11g.

An output gear 12 is mounted on the serrated portion 11e of the shaft 11 so that the output gear 12 and the serrated portion 11e of the shaft 11 are rotatable together. In the accommodating space E, a driven gear 13 is rotatably supported on the housing 81a and the cover 84 via a pin 13a, and is positioned in opposition to the output gear 12. The geared cable 6 which is accommodated in the accommodating space E is in meshing engagement with both the output gear 12 and the driven gear 13.

A rotor 14 formed of a magnetic material is mounted on the serrated portion 11g of the shaft 11 so that the rotor 14 rotates together with the serrated portion 11g of the shaft 11. The upper and lower surfaces of the rotor 14 are provided with respective annular grooves 14b, 14c which communicate with each other by a plurality of circumferentially arranged arc-shaped slots 14a having a common center point. An annular geared projection 14d is formed on the upper surface of the rotor 14 and is positioned outside the groove 14c.

Figure 5:
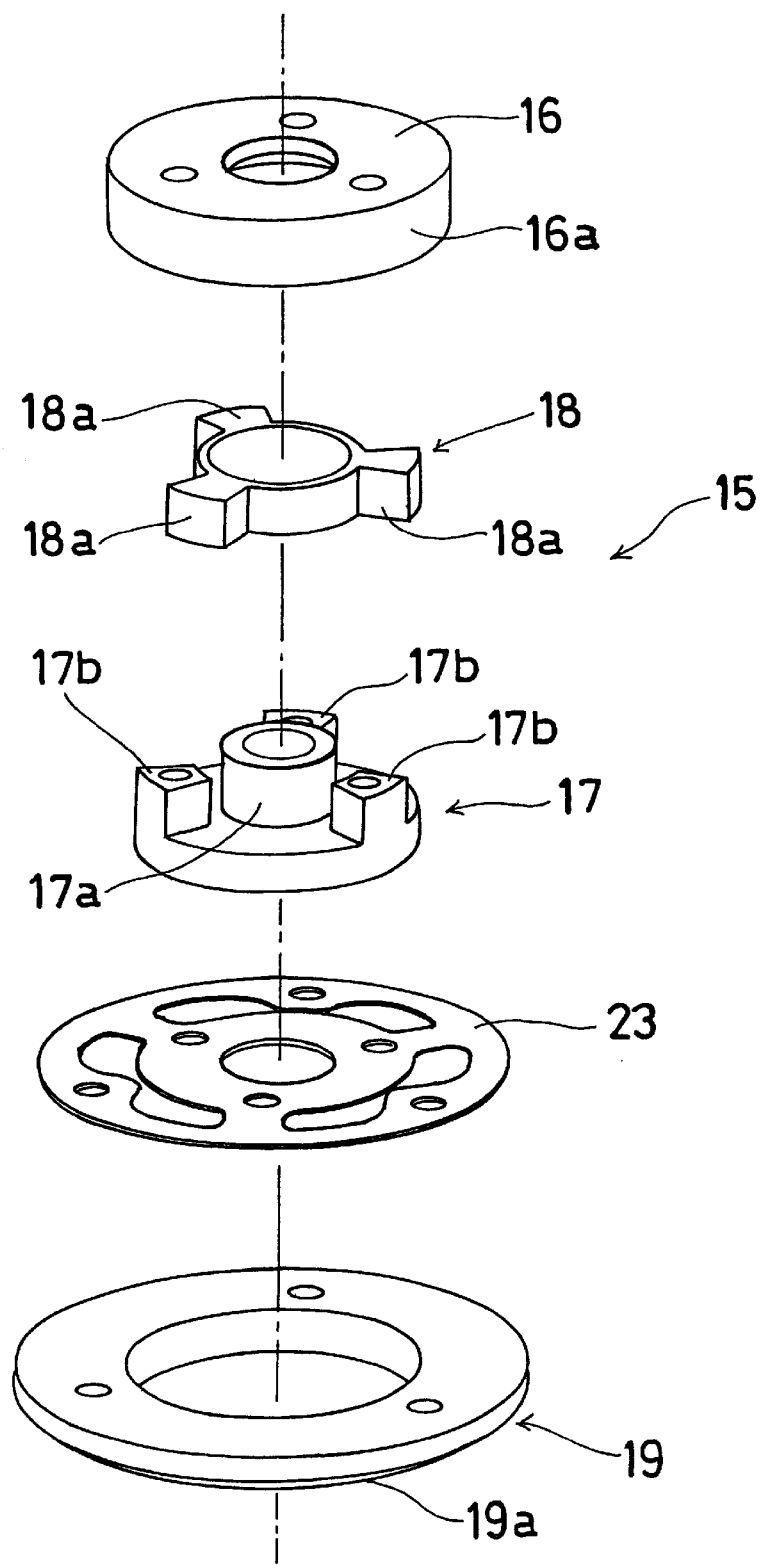
FIG. 5 is an exploded perspective view of the second disk assembly employed in the driving device shown in FIG. 3.
Figure 6:
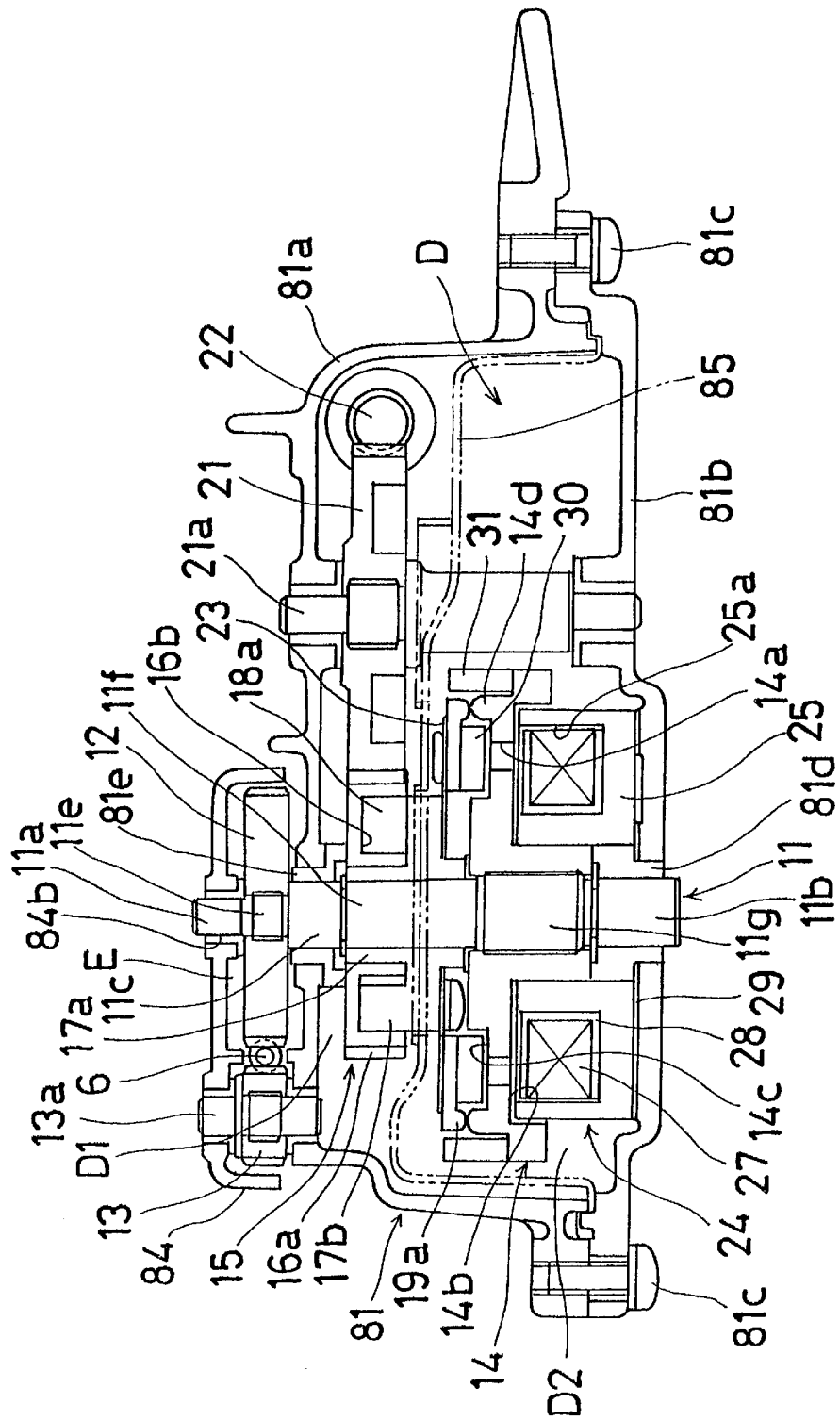
FIG. 6 is a cross-sectional view taken along the section line VI—VI in FIG. 3.
Figure 7:
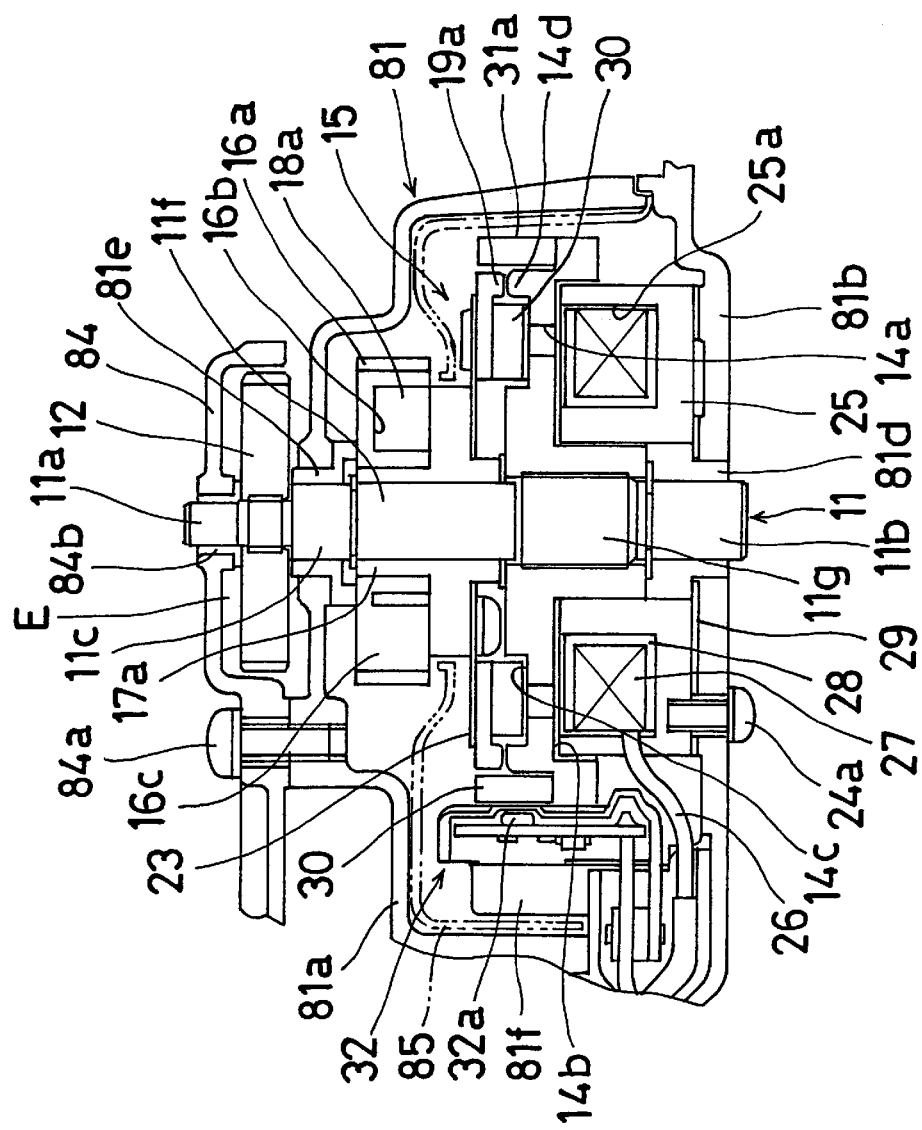
FIG. 7 is a cross-sectional view taken along the section line VII—VII in FIG. 3.

A disk assembly 15 is mounted on the supporting portion 11f of the shaft 11 so as to rotate relative to the supporting portion 11f. As best shown in FIG. 5, the disk assembly 15 includes an input wheel 16, an output wheel 17, a movable plate 19, and an elastic member 18 formed of, for example, rubber. The output wheel 17 is rotatably mounted on the supporting portion 11f of the shaft 11.

The input wheel 16 is rotatably mounted on a boss portion 17a of the output wheel 17. The outer periphery of the input wheel 16 possesses a geared configuration 16a which is in indirect meshing engagement with a worm gear 22 via an idle gear 21. The idle gear 21 is positioned in the inner space D of the casing 81 and is rotatably supported on the two housing parts 81a, 81b via a pin 21a. The worm gear 22 which is in meshing engagement with the idle gear 21 is fixedly mounted on the output shaft of the motor 82 which extends into the inner space D of the casing 81. The idle gear 21 and the worm gear 22 constitute a speed reduction gear train.

The input wheel 16 is provided in its lower surface with an annular groove 16b into which a plurality of projections 16c extend. The output wheel 17 is provided with equi-pitched projections 17b each of which, when fitted in the annular groove 16b in the input wheel 16, is in opposition to two adjacent projections 16c, 16c. An elastic member 18 which is accommodated in the annular groove 16b of the input wheel 16 has equi-pitched damper portions 18a each of which is positioned between two adjacent projections 16c, 17b.

The movable plate 19 is in the form of a circular plate. The upper surface of the movable plate 19 is secured to a ring-shaped leaf spring 23 by way of screws which is riveted to the output wheel 17, thus allowing the movable plate 19 to rotate together with the output wheel 17. The movable plate 19 is capable of being deformed in its axial direction, which enables the movable plate 19 to move in the axial direction. The movable plate 19 is provided at its lower surface with a ring-shaped or annular geared portion 19a.

When the electric motor 82 is turned on, the resulting rotational torque is transmitted, by way of the speed-reduction gear train, to the input wheel 16. The resulting rotation of the input wheel 16 is transmitted from the projections 16*a* of the input wheel 16 to the projections 17*b* of the output wheel 17 via the damper portions 18*a* of the elastic member 18, thereby rotating the output wheel 17. At this time, the damper portions 18*a* of the elastic member 18 absorb shocks to some extent which inevitably occur between the input wheel 16 and the output wheel 17.

The rotation of the output wheel 17 is transmitted by way of the leaf spring 23 to the movable plate 19. This causes rotation of the movable plate 19, thereby rotating the rotor 14 which is in meshing engagement with the movable plate 19 by engagement of the geared portion 19*a* of the movable plate 19 with the geared projection 14*d* on the rotor 14.

A ring-shaped or annular electromagnetic coil winding device 24 is accommodated within the inner space D of the casing 81 so that the electromagnetic coil winding device 24 is positioned around the shaft 11. The coil winding device 24 includes a core 25 and a coil winding 27. The core 25 is formed of a magnetic material and has an upper open-faced annular groove 25*a*. The coil winding 27 is supplied with electric current from an external power supply by way of a pair of harnesses 26. The coil winding 27 is formed on a bobbin 28 in winding mode and is accommodated in the annular groove 25*a*. The electromagnetic coil winding device 24 is positioned in the annular groove 14*b* of the rotor 14 and is secured to the housing 81*b* of the casing 81 by a plurality of bolts 24*a*. An anti-vibration plate 29 made of a rubber or a resin material is held between the housing 81*b* and the coil winding device 24.

A ring-shaped or annular armature 30 which is formed of electromagnetic material is fixedly mounted on the lower surface of the movable plate 19. The armature 30 is positioned in the annular groove 14*c* of the rotor 14 and is located in opposition to the electromagnetic coil winding device 24 with the rotor 14 being located between the armature 30 and the electromagnetic coil winding device 24. Positioning the electromagnetic coil winding device 24 and the armature 30 in the respective annular grooves 14*b*, 14*c* of the rotor 14 reduces the axial extent or thickness of the driving device 8, thereby establishing a thinner driving device 8.

The movable plate 19 of the disk assembly 15, the rotor 14, and the electromagnetic coil winding device 24 together constitute a clutch mechanism CL.

When the coil winding 27 of the electromagnetic coil winding device 24 is energized, a magnetite closed loop is produced which circulates through the coil winding 27, the core 25, the rotor 14, and the armature 30. This generates an electromagnetic force attracting the armature 30 toward the rotor 14. Then, the movable plate 19 is brought into axial movement toward the rotor 14 in such a manner that the movable plate 19 is increasingly deformed, which causes a meshing engagement between the geared portion 19*a* of the movable plate 19 and the geared portion 14*a* of the rotor 14. Thus, the clutch mechanism CL assumes its ON-condition which allows the rotor 14 to rotate together with the disk assembly 15. At this time, the anti-shock plate 29 decreases the shock sound which is inevitably generated upon meshing engagement between the geared portion 19*a* of the movable plate 19 and the geared portion 14*a* of the rotor 14, thereby reducing the resonance sound at the lateral side 2*a* of the vehicle body 2. Thus, the sound which occurs during the operation of the driving device 8 becomes reduced to a significant extent.

On the other hand, when current application to the coil winding 27 of the electromagnetic coil winding device 27 is interrupted, the foregoing attraction force disappears or is no longer present. The restoration force of the leaf spring 23 thus causes the reverse axial movement of the movable plate 19, thereby releasing the geared portion 19*a* of the movable plate 19 from the geared portion 14*d* of the rotor 14. The clutch mechanism CL thus assumes the OFF-condition under which the disk assembly 15 is able to rotate relative to the rotor 14.

An annular magnet 31 is fixedly positioned in the annular groove 14*c* of the rotor 14. The magnet 31 is positioned outside the magnetite closed loop which circulates through the core 25, the rotor 14, and the armature 30. Thus, the magnet 31 is not affected even when the coil winding 27 is being applied with current. Plural sets of N-pole and S-pole combinations are magnetized alternately along the entire outer periphery 31*a* of the magnet 31 in such a manner that the N-poles and S-poles are arranged alternately.

A door sensor 32 is provided in the casing 81 and is positioned to oppose the magnet 31. The sensor 32 includes a pair of Hall elements 32*a*, 32*a* both of which are secured to a vertical wall 81*f* of the housing 81*b* by screws. While the magnet 31 is being rotated, the Hall elements 32*a* 32*a* issue signals, respectively, which are of a phase difference of 90 degrees. This means that the sensor 32 serves for detecting the rotational condition of the rotor 14. Such signals are fed to a CPU 141 of an electronic control device 100 as will be described later and are used to calculate the sliding speed of the slide door 1, the sliding direction of the slide door 1, and the current position of the slide door 1.

A divider 85 is positioned in the casing 81 such that the outer periphery of the divider 85 is held between the housings 81*a*, 81*b*. The shaft 11 passes through the divider 85. The divider 85 divides the inner space D of the casing 81 into a first inner sub-space D1 and a second inner sub-space D2. The input wheel 16 of the disk assembly 15 and the speed reduction gear train are accommodated in the first inner sub-space D1, while the output wheel 17 of the disk assembly 15, the movable plate 19, the rotor 14, the electromagnetic coil winding device 24, and the sensor 32 are accommodated in the second inner sub-space D2. Due to this arrangement, the rotor 14, the movable plate 19, and the sensor 32 are not liable to be infiltrated with grease between the idle gear 21 and the input wheel 16 and with metal powder generated by the meshing engagement.

The following is a description of the operation of the driving device 8 in conjunction with slide movement of the slide door 1. To slide the slide door 1, the clutch mechanism CL is first brought into the ON-condition under which the rotor 14 is rotatable together with the disk assembly 15 due to the fact that the geared portion 14*d* of the rotor 14 is in meshing engagement with the geared portion 19*a* of the movable plate 19 while the coil winding 27 of the coil winding device 24 is being energized. Under such a condition, if the electric motor 82 is turned on, the resulting rotation, after passing through the speed reduction gear train, rotates the disk assembly 15 and the rotor 14, which causes rotation of the shaft 11, thereby rotating the output gear 12. Thus, the geared cable 6 which is in meshing engagement with the output gear 12 is moved in one direction to open the slide door 1 or in the opposite direction to close the slide door 1. Establishing concurrent rotation of the rotor 14 and the disk assembly 15 causes an electrical operation of the slide door 1 under which the slide door 1 is moved by the electric motor 82. Immediately upon the slide door 1 being brought into its fully opened condition or closed condition, the current application to the coil winding 27 of the electromagnetic coil winding device 24 and the electric motor 82 is turned off.

When the clutch mechanism CL is in the OFF-condition, the rotor 14 is rotatable relative to the disk assembly 15 due to the fact that the geared portion 14d of the rotor 14 is out of meshing engagement with the geared portion 19a of the movable plate 19 and the coil winding 27 of the coil winding device 24 is not being energized. Under such a condition, manual operation of the slide door 1 is established. That is, if the slide door 1 is moved manually in one direction to open the slide door or is moved in the opposite direction to close the slide door, the resulting movement of the geared cable 6 rotates the shaft 11 due to the fact that the geared cable 6 is in meshing engagement with the output gear 12, The rotor 14 is thus rotated. At this time, the geared portion 14d of the rotor 14 is out of meshing engagement with the geared portion 19a of the movable plate 19 and so rotation of the rotor 14 is not transmitted to the disk assembly 15.

Figure 4:
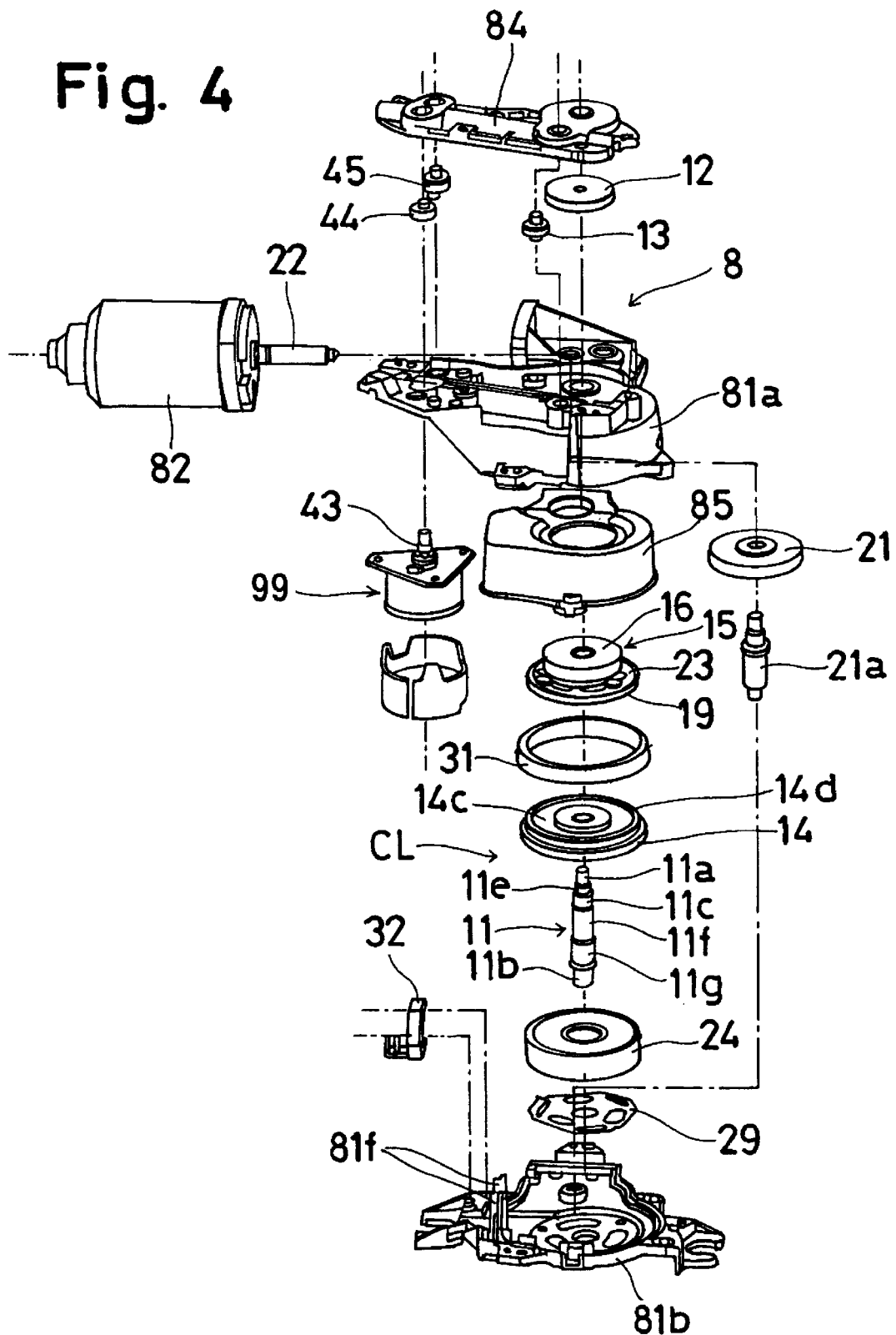
FIG. 4 is an exploded perspective view of the driving device shown in FIG.3.

As can be understood from the illustration of FIG. 4, the clutch mechanism CL is provided with a brake device 99.

Figure 8:
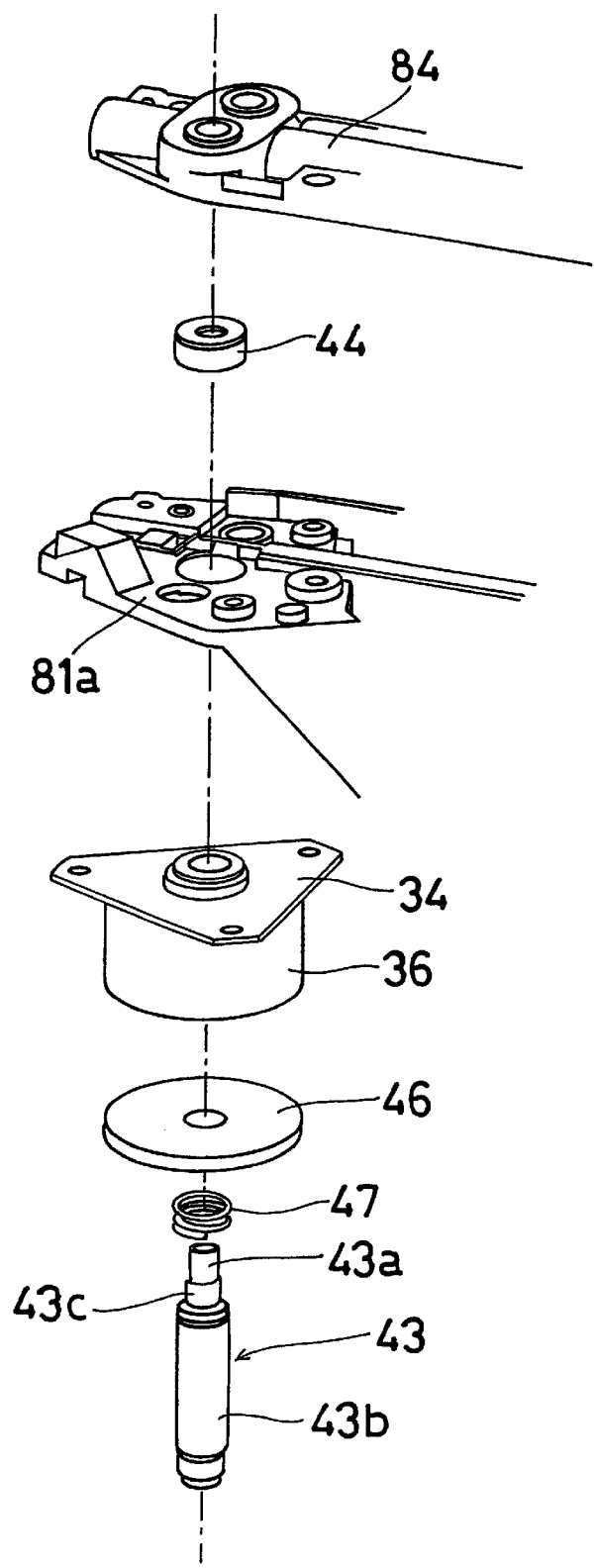
FIG. 8 is an exploded perspective view of the brake device used in conjunction with the driving device shown in FIG. 3.
Figure 9:
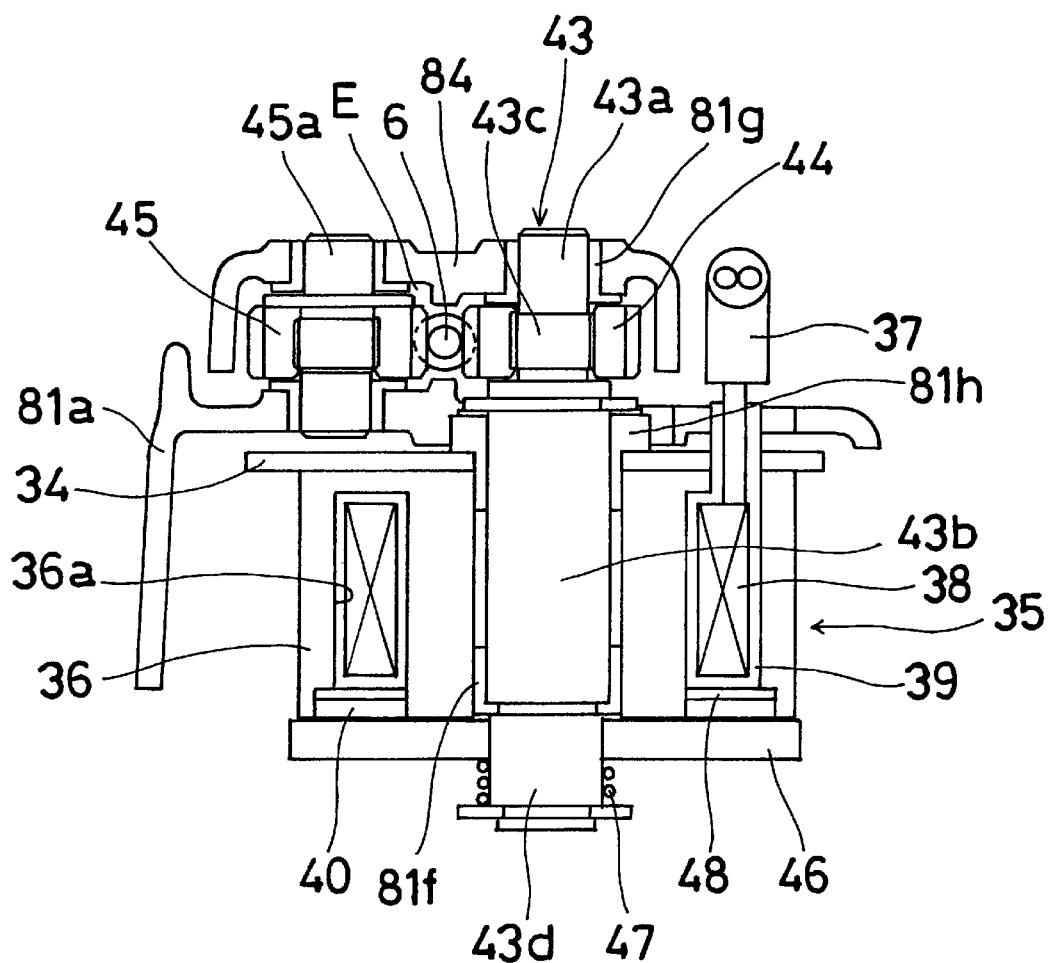
FIG. 9 is a cross-sectional view taken along the section line IX—IX in FIG. 3.

With reference to FIGS. 8 and 9, a bracket 34 is secured by bolts to the housing part 81a of the casing 81. The bracket 34 is fixed with an electromagnetic coil winding device 35. The coil winding device 35 includes a core 36 and a coil winding 38. The core 36 is formed of a magnetic material and has a lower open-faced annular groove 36a. The coil winding 38 is applied with electric current from an external power supply by way of harness wires 37. The coil winding 38 is mounted on a bobbin 39 and is accommodated in the annular groove 36a. The opening of the annular groove 36a is closed by an annular metal plate 48 and a friction plate 40 in such a manner that the friction plate 40 projects slightly beyond the bottom of the core 36.

A shaft 43 is journalled in the electromagnetic coil winding device 35 via a pair of axially spaced bushes 81g, 81f. The shaft 43 is so positioned as to traverse the accommodating space E after passing through the bracket 34 and the housing 81a. One end side portion 43a of the shaft 43 is journalled in the cover 84 via a bush 81g, and an intermediate portion 43b of the shaft 43 around which the coil winding device 35 is positioned is journalled in both the bracket 34 and the housing 81a via a bush 81h. The shaft 43 is provided with a serration portion 43c between the end portion 43a and the intermediate portion 43b, and is located within the accommodating space E. The other end portion of the shaft 43 defines another serration portion 43d located adjacent or next to the intermediate portion 43b.

A brake gear 44 is mounted on the serration portion 43c of the shaft 43 and is thus rotated together with the serration portion 43c. A driven gear 45 is positioned in the accommodating space E. The driven gear 45 is fixedly mounted on a pin 45a whose opposite end portions are journalled in the housing 81 and the cover 84 respectively. The driven gear 45 is positioned in opposition to the brake gear 44. The brake gear 44 is in indirect meshing engagement with the driven gear 45 via the geared cable 6 which extends through the accommodating space E.

An armature 46 is mounted on the serration portion 43d of the shaft 43 so that the armature is movable along the serration portion 43d of the shaft 43 and is rotatable together with the serration portion 43d of the shaft 43. The armature 46 is formed of a magnetic material and is configured as a circular plate.

The armature 46 is urged continually by a spring 47 that is arranged around the shaft 43 so that the armature 46 is in slight face-to-face contact with the friction plate 40.

When the coil winding 38 of the coil winding device 35 is energized, a magnetic closed loop is formed which passes through the coil winding 38, the core 36 and the armature 46, thereby generating an electromagnetic force which attracts the armature toward the rotor 36. Thus, the armature 46 moves along the shaft 43 toward the core 36 so that the armature 46 is strongly brought into engagement with the friction force 40, thereby imparting a large friction force acting as a brake force to the armature 46 under rotation. When the coil winding 38 of the coil winding device 35 is de-energized, there is no magnetic attraction force which attracts the armature toward the core 36, thus allowing the armature 46 to rotate freely relative to the friction plate 40. The reason is that between the friction plate 40 and the armature 46 under rotation, there is a very small amount of friction force which is unable or insufficient to brake the friction plate 40.

The operation of the brake device 99 in conjunction with the movement of the slide door 1 is as follows. While the slide door 1 is moving, the geared cable 6 is also moving in one direction (or the other direction), and the meshing engagement between the geared cable 6 and the brake gear 44 causes the brake gear 44, the shaft 43, and the armature 46 to rotate.

When the slide door 1 is moving by virtue of either the driving operation of the driving device 8, manual operation, or gravity unexpectedly applied to the slide door 1 when the vehicle is parked on a slanted or sloping road, the CPU 141 calculates the sliding speed of the slide door 1 on the basis of the signals issued from the sensor 32. If the detected sliding speed of the slide door 1 exceeds a predetermined value, the coil winding 38 of the coil winding device 35 is energized, and an immediate and strong engagement of the armature 46 with the friction plate 40 occurs, thereby generating a very large friction force between the armature 46 and the friction plate 40. Thus, with little time lag, a braking force is applied to the slide door 1.

The foregoing operation of the brake device 99 is under the control of the CPU 141. The electronic control device 100 allows the operator to move the slide door 1 in a smooth manner when the slide door 1 is switched to the manual mode.

In addition, in the case where no driving device 8 is provided to the vehicle, the brake device 99 can be applied thereto. That is, solely the use of the brake device 99 can be employed. In this structure, the magnet 31 is positioned on the armature 46 and the sensor 32 opposing thereto detects the rotational condition of the armature 46 for determining the sliding speed, the sliding direction, and the current position of the slide door 1.

Figure 10:
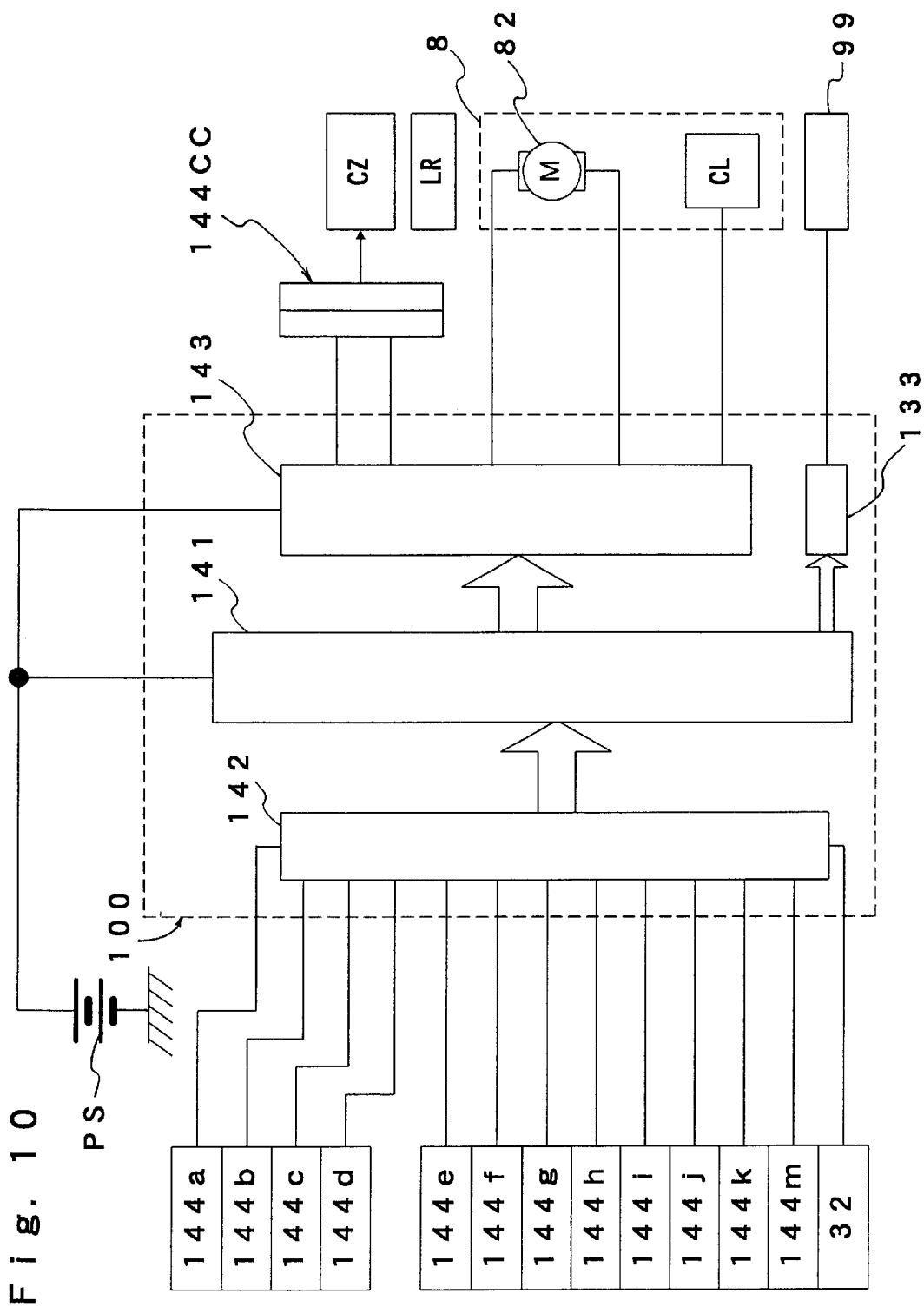
FIG. 10 is a schematic illustration of the electronic control device used in the slide door apparatus of the present invention.

FIG. 10 illustrates the electronic control device 100 by which the drive device 8 and the brake device 99 are controlled in the electronic mode. The electronic control device 100 includes the CPU 141, an input interface 142, a driving circuit 143, and a PWM control circuit 133. The input interface 142 is connected with a cancel switch 144a, an operation switch 144b, a junction switch 144c, a pawl switch 144d, a courtesy switch 144e, a touch switch 144f, an ignition switch 144g, a shift sensor 144h, a foot brake sensor 144i, a parking brake sensor 144j, a vehicle speed sensor 144k, an engine sensor 144m, and the door sensor 32. The CPU 141 orders the drive circuit 143 and the PWM control circuit 133 to operate the drive device 8 and the brake device 99, respectively, on the basis of signals fed from each of the switches and sensors.

The cancel switch 144a is used, when turned on, to invalidate the power slide control mode of the slide door 1. In other word, when the cancel switch 144a is closed, the slide door 1 is only movable manually. The operation switch 144b is used to open the slide door 1 which is under the power slide mode when the switch 144b is brought into a first closed position and is used to close the slide door 1 which is under the power slide mode when the switch 144b is brought a second closed position.

The junction switch 144c is provided between the lateral side 2a and the slide door 1. The junction switch 144c is closed when the slide door 1 is closed to close the opening area 2b and is opened immediately when the slide door 1 is opened to open the opening area 2b. The junction switch 144c has a power supply portion 144cc through which electric power is supplied from the body side to a closer CZ and a latch releaser LR.

The pawl switch 144d is associated with the closer CZ and is closed when the slide door 1 is in the full-latched condition or the half-latched condition. The courtesy switch 144e is closed when the slide door is in the opened condition or the half-latched condition. The touch switch 144f is closed when a substance, item, or a portion of human body is held between the vertical inner periphery of the opening area 2b and the slide door 1 which is being closed. The closer CZ is used to bring the slide door 1 from its half-latched condition to its fully-latched condition when the slide door 1 is being closed, while the latch releaser LR is used to release the latched condition of the slide door 1 when it is opened.

Figure 11:
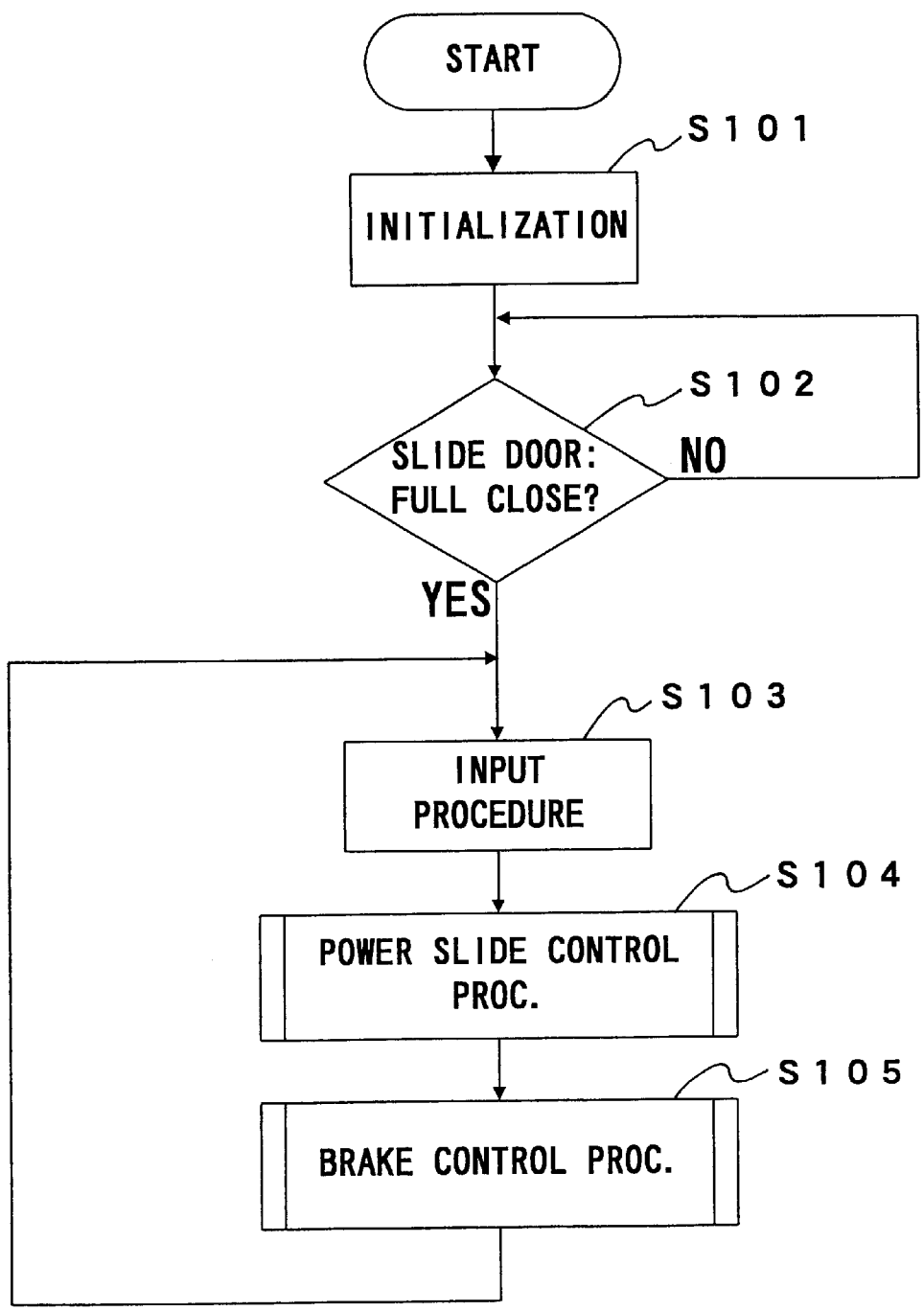
FIG. 11 is a flowchart of the operational control associated with the electronic control device.
Figure 14:
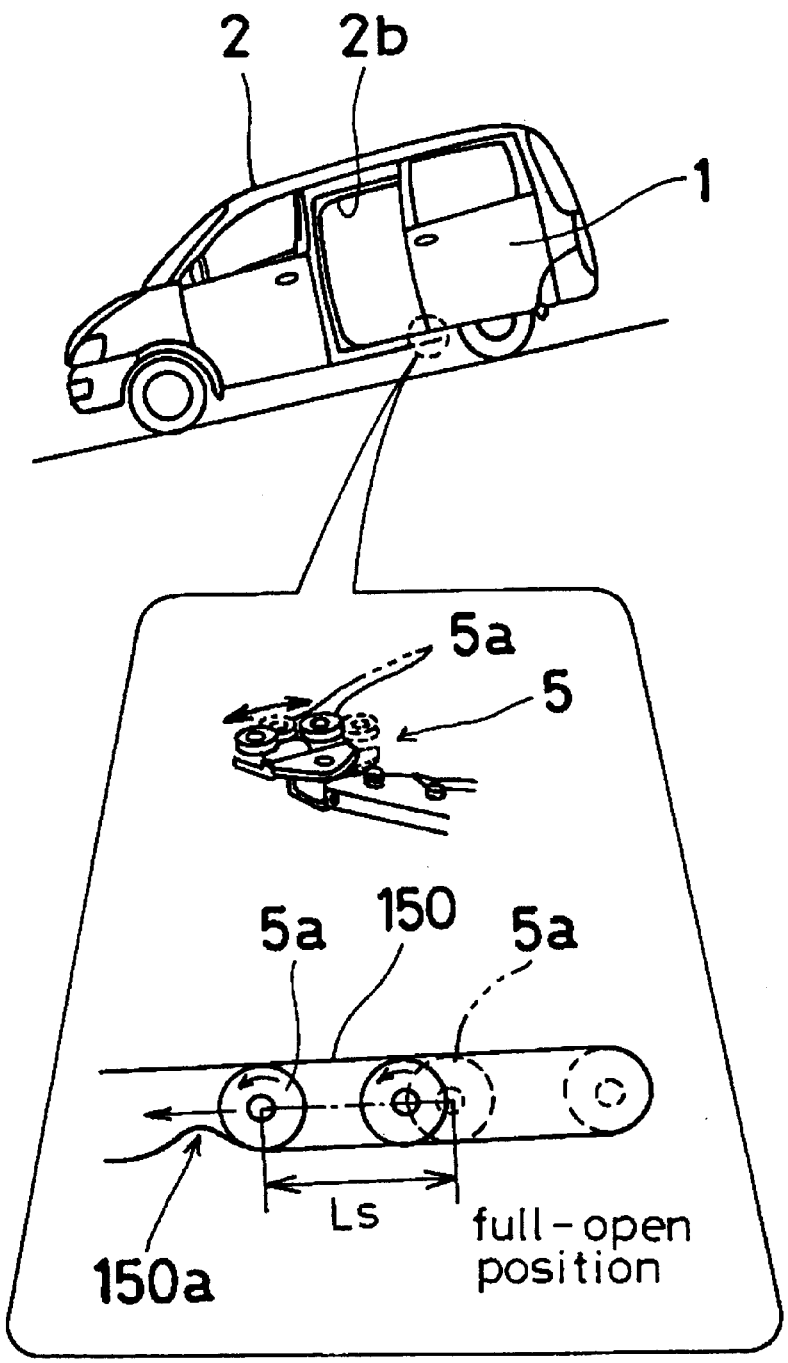
FIG. 14 is an illustration of the relationship between a roller and a vehicle body when the vehicle is parked on a sloping or slanted road.

The following is an explanation of the operation of the electronic control device 100 for opening and closing the slide door 1. First of all, the electronic control device 100 is turned on when an amount of electric power is supplied to the control device 100 from a power source PS. The main routine shown in FIG. 11 is then executed periodically. At step S101, initialization is made to check the system conditions and to set counters and so on to zero or other starting values. At step S102, it is determined whether or not the slide door 1 is in the fully closed condition. The closure of the pawl switch 144d and the opening of the courtesy switch 144e are indicative of the fully closed condition of the slide door 1. If the decision in step S102 is Yes, an input procedure is executed at step S103 in which information from the switches and sensors are fed to and stored in the CPU 141. Thereafter, at step S104, a power slide control procedure is executed wherein the slide door 1 is switched from the manual operation mode to the automatic or electrical operation mode. After completion of the power slide control procedure, a brake control procedure is executed at step S105. After completion of the brake control procedure, the control returns to step S103 wherein if the clutch device 8 is brought into the OFF-condition after the slide door is opened fully under the automatic mode, the geared cable 6 is intermittently applied with a braking force to prevent the roller 5a of the lower positioned roller unit 5 from climbing over a stop position 150a of a check spring 150 as shown in FIG. 14.

Figure 12A:
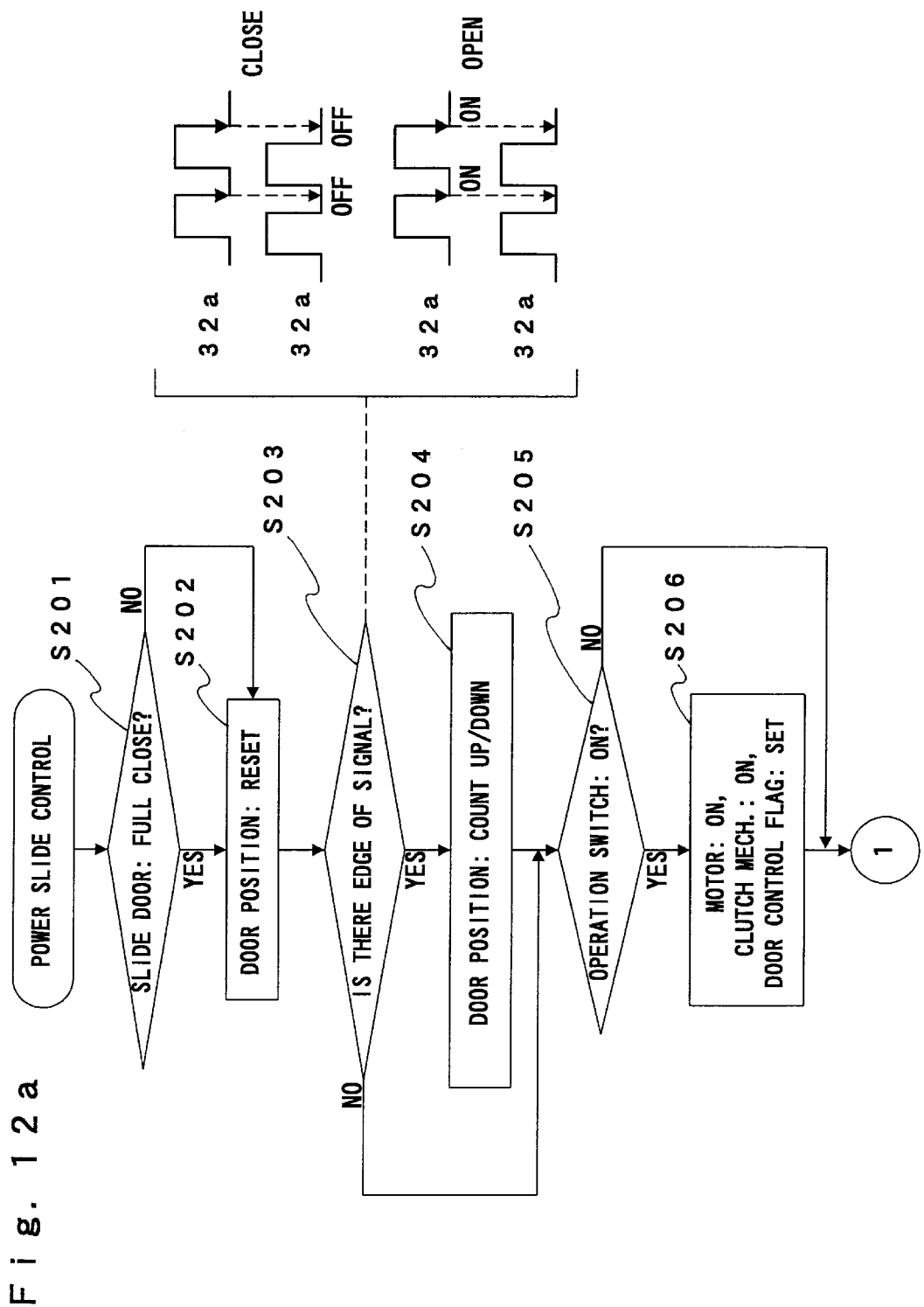
FIGS. 12a and 12b illustrate a flowchart of the operational control associated with the power slide procedure mode.
Figure 12B:
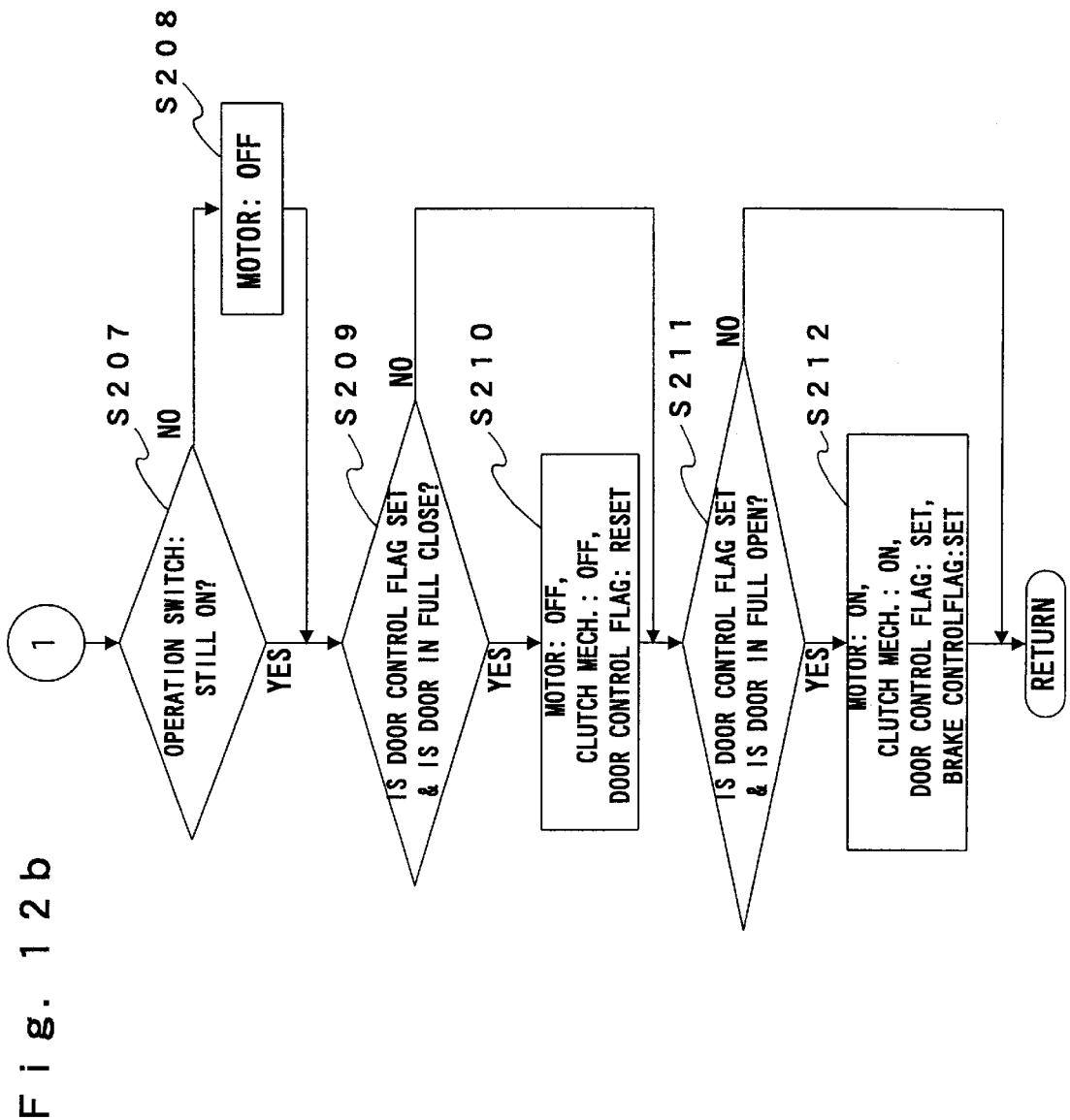

The power slide control procedure of step S104 is carried out according to the flowchart shown in FIGS. 12a and 12b. At step S201, on the basis of conditions of the pawl switch 144d and the courtesy switch 144e respectively, it is determined whether or not the slide door 1 is in the fully closed position. If it is, step S202 is executed to set a counter to zero or rest for setting a criteria or reference position. If it is determined at step S201 that the slide door 1 is not in the fully closed position, the control proceeds to step S203.

At step S203, it is determined whether or not the signals from the respective Hall elements 32a, 32a of the door sensor 32 change. As mentioned above, moving the slide door 1 causes the magnet 31 to rotate, thereby generating signals between which a phase difference of 90 degrees is developed from the hall elements 32a, 32a. The relationship between the signals differs depending on the direction of rotation of the magnet 31 as shown at the right-side of the symbol of step S203. That is, while the slide door 1 is in the course of closing, each falling edge of one signal corresponds to the bottom of the other signal, whereas when the slide door 1 is in the course of opening, each falling edge of one signal corresponds to the top of the other signal. Using this phenomena, renewing the content of the counter by counting up (down) the number of falling edges of one signal while watching the bottoms (the tops) of the other signal reveals the correct current position of the slide door 1.

At step S205, it is determined whether or not the operation switch 144b is shifted from the opened position to the closed position. If the determination in step S205 is No, the control goes to step S207. If the determination in step S205 is Yes, the motor 82 and the clutch mechanism CL are turned on, thereby causing concurrent rotations of the rotor 14 and the movable plate 19. Simultaneously, a door control flag is set. However, at this time, the slide door 1 is in its latched condition and for releasing the same, the latch release RL is turned on for a time duration of about 1 second.

At step S207, it is determined whether or not the operation switch 144b is still closed or on. If it is not, the motor 82 is turned off at step S208. If the operation switch 144b is still closed, the program proceeds to step S209 where it is determined whether or not the door control flag is set and the slide door 1 is in the fully closed condition. If the determination at step S209 is No, the control goes to step S211. If the determination at step S209 is Yes, the program proceeds to step S210 where the motor 82 is turned off and the clutch mechanism CL is turned off for interrupting the connection between the motor 82 and the slide door 1 due to the fact that so long as the slide door 1 is brought into its fully closed position under the power slide control mode no more movement of the slide door 1 is required.

Figure 13:
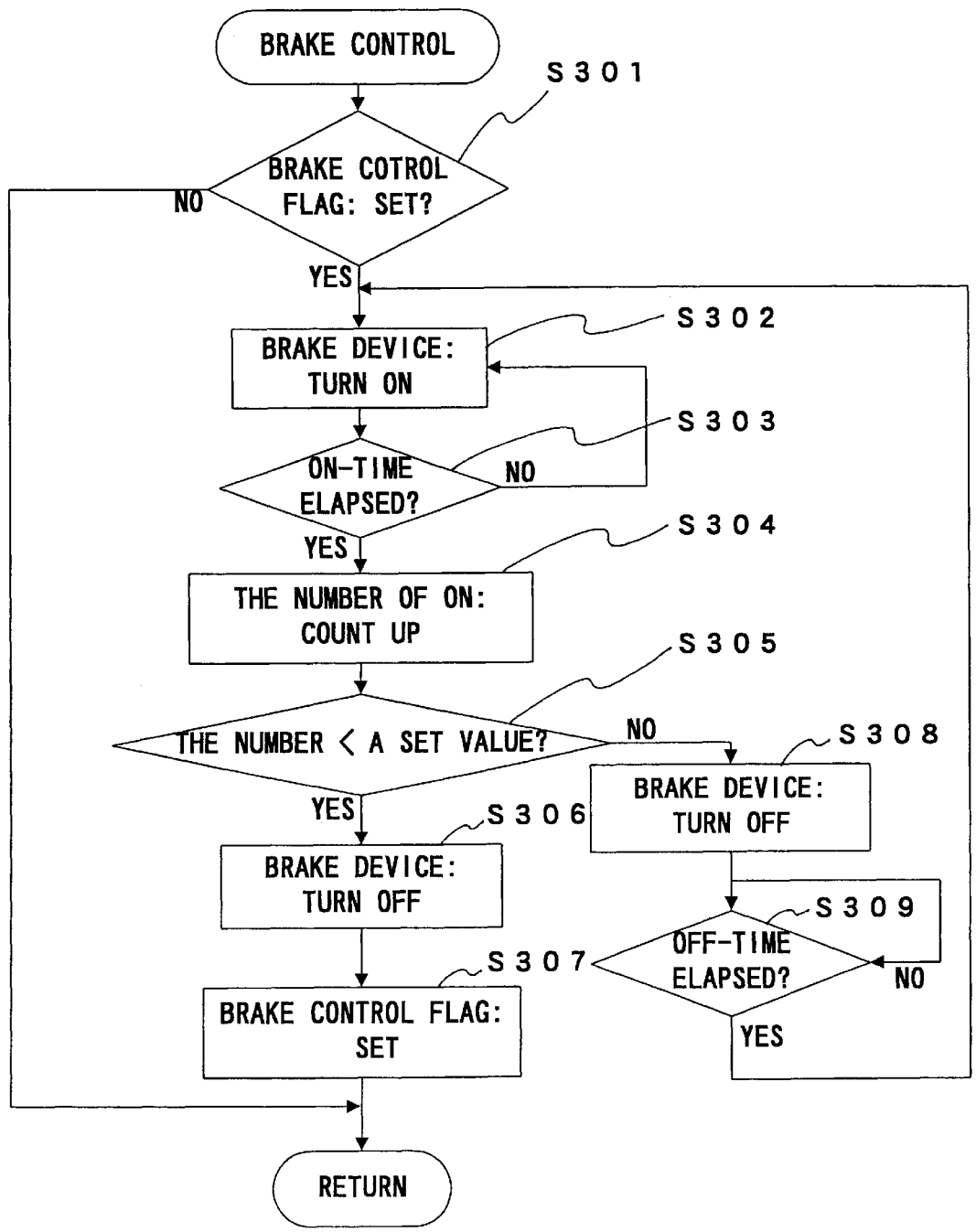
FIG. 13 is a flowchart of the operational control associated with the brake operation procedure.

At step S211, it is determined whether or not the door control flag is being set and the slide door 1 is in its fully opened position. If not, the control terminates this procedure. If true, the motor 82 is turned off and the clutch mechanism CL is turned off for interrupting the connection between the motor 82 and the slide door 1 due to the fact that so long as the slide door 1 is brought into its fully opened position under the power slide control mode no more movement of the slide door 1 is required. At this time, each roller 5a (FIG. 14) of the roller unit 5 is at its fully opened position and is out of engagement with a retaining portion 150a of a check spring 150 provided in the lower guide rail. Thus, a brake control flag is set and the brake control procedure whose control is shown in FIG. 13 is executed for bringing the roller 5a into engagement with the retaining portion 150a of the check spring 150.

The brake control procedure is to bring the roller 5a of the roller unit 5 close to the retaining portion 150a of the check spring 150 after turning off the clutch mechanism CL which is subsequent to the establishment of the fully opened position of the slide door 1. Such a result is achieved by applying the braking force to the geared cable 6 intermittently in order to prevent climbing of the roller 5a over the retaining portion 150a of the check spring 150.

At step S301, it is checked whether or not the brake control flag is being set which is indicative that the slide door 1 is in its fully opened position under the power slide control mode. If the brake control flag is not being set, the control terminates this procedure. If the determination in step S301 is yes, at step S302 the brake device 99 is turned on, which results in, as previously explained, the rotation of the shaft 11 being restricted by the friction force between the armature 46 and the friction plate 40, thereby applying a braking force to the geared cable 6. The braking force depends on or is in proportion to the amount of current to the coil winding 38 which is under the control of the PWM control circuit 133.

At step S303, it is checked whether or not a time of, for example 100 ms, has elapsed. Immediately upon elapse of such time, step S304 is executed to count how may times the brake device 99 has been turned on. At step S305, it is determined whether the result of step S304 is or is not in excess of a set number, for example 8. If the determination in step S305 is No, the brake device 99 is turned off at step S308, and at step S309 it is checked whether or not an OFF time duration of, for example, 60 ms has elapsed. If Yes, the control goes to step S302.

If the result of step S305 is Yes, the brake device 99 is turned off at step S306, and the brake control flag is reset which is indicative of termination of the brake control mode.

It is to be noted that the foregoing numerals can be changed subject to the roller 5a being near or in abutment with the retaining portion 150a of the check spring 150 and the slide door 1 failing to climb over the retaining portion 150a when the slide door 1 is under the manual operation mode.

In accordance with the present invention, the electronic control device controls the brake device to restrict movement of the slide door from the opened position to the closed position. Thus, the slide door under the opened condition is retained at a retaining portion of a position of the check spring. The electronic control device orders the brake device to intermittently apply the braking force depending on the condition of the slide door, and thereafter to release the slide door from its electric operation mode. Thus, if the vehicle parks on a sloping or inclined road, the roller can approach near the retaining portion of the check spring so as not to climb over.

The electronic control device also orders the brake device to apply the braking force intermittently depending on the condition of the slide door while the slide door is released from its electric operation mode. Thus, the braking operation can be made independent of the electric operation mechanism.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A vehicular slide door apparatus comprising:
    a slide door movable in a lengthwise direction of a vehicle body for opening and closing an opening area formed in a lateral side of the vehicle body the slide door being moved in an electric operation mode and a manual operation mode;
    a brake device provided at the lateral side of the vehicle body for applying a brake force to the slide door; and
    an electronic control device operatively associated with the brake device to restrict movement of the slide door from an opened position to a closed position by controlling the brake device to apply the brake force intermittently while the slide door is released from the electric operation mode.

2. The vehicular slide door apparatus as set forth in claim 1, wherein the electronic control device interrupts control of the brake device to apply a braking force intermittently when the slide door reaches a retaining portion formed on the vehicle body.

3. A vehicular slide door apparatus comprising:
    a slide door mounted on a lateral side of a vehicle body for movement in a lengthwise direction of the vehicle body between a fully opened position and a fully closed position;
    a brake device operatively associated with the slide door for applying a brake force intermittently to restrict sliding movement of the slide door; and
    a control device operatively associated with said brake device to operate said brake device and restrict movement of said slide door when said slide door reaches the fully open position.

4. The vehicular slide door apparatus as set forth in claim 3, including a cable operatively associated with the slide door and a drive device operatively associated with the cable, said drive device moving said cable to cause sliding movement of the slide door between the fully open position and the fully closed position.

5. The vehicular slide door apparatus as set forth in claim 4, wherein said brake device includes a coil winding device, an armature and a rotatable brake gear, said brake gear meshingly engaging the cable, said brake gear and said armature being mounted on a shaft which extends through said coil winding device, said armature being urged into frictional engagement with a friction plate upon energization of the coil winding device to restrict rotation of the brake gear and movement of the cable.

6. The vehicular slide door apparatus as set forth in claim 4, wherein said brake device applies a braking force to the cable.

7. The vehicular slide door apparatus as set forth in claim 3, including a cable operatively associated with the slide door, said braking device including a rotatable brake gear which engages the cable and which is restrained from rotating through frictional contact against a member that is connected to the brake gear.

8. The vehicular slide door apparatus as set forth in claim 3, wherein the control device interrupts to restrict the movement of said slide door when the slide door reaches a retaining portion formed on the vehicle body.

9. The vehicular slide door apparatus as set forth in claim 3, wherein the control device restricts the movement of said slide door while the slide door is released from an electric operation mode.

10. A vehicular slide door apparatus comprising:
    a slide door mounted on a lateral side of a vehicle body for sliding movement in a lengthwise direction of the vehicle body between a fully opened position and a fully closed position;
    an elongated member operatively connected to the slide door to move with the slide door;
    a brake device operatively associated with the elongated member for applying a brake force intermittently to the elongated member to restrict sliding movement of the slide door; and a control device connected to the brake device to control operation of the brake device and cause the brake device repeatedly to apply the braking force to the elongated member for a predetermined time period and to release the braking force upon elapse of the predetermined time period, for a predetermined number of times, as long as the slide door moves to a retaining portion formed on the vehicle body.

11. The vehicular slide door apparatus as set forth in claim 10, wherein the elongated member is a cable, and including a drive device operatively associated with the cable to move said cable and cause sliding movement of the slide door between the fully open position and the fully closed position.

12. The vehicular slide door apparatus as set forth in claim 11, wherein said brake device includes a coil winding device, an armature and a rotatable brake gear, said brake gear meshingly engaging the cable, said brake gear and said armature being mounted on a shaft which extends through said coil winding device, said armature being urged into frictional engagement with a friction plate upon energization of the coil winding device to restrict rotation of the brake gear and movement of the cable.

* * * * *